United States Patent
Kitano et al.

(10) Patent No.: US 11,046,043 B2
(45) Date of Patent: Jun. 29, 2021

(54) LINERLESS THERMOSENSITIVE RECORDING BODY PACKAGE

(71) Applicants: Tohru Kitano, Shizuoka (JP); Tomohisa Kakuda, Shizuoka (JP); Hiroaki Matsui, Shizuoka (JP)

(72) Inventors: Tohru Kitano, Shizuoka (JP); Tomohisa Kakuda, Shizuoka (JP); Hiroaki Matsui, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/493,559

(22) PCT Filed: Mar. 12, 2018

(86) PCT No.: PCT/JP2018/009366
§ 371 (c)(1),
(2) Date: Sep. 12, 2019

(87) PCT Pub. No.: WO2018/168727
PCT Pub. Date: Sep. 20, 2018

(65) Prior Publication Data
US 2020/0023663 A1 Jan. 23, 2020

(30) Foreign Application Priority Data

Mar. 17, 2017 (JP) .............................. JP2017-053299

(51) Int. Cl.
*B32B 5/30* (2006.01)
*B32B 7/02* (2019.01)
*B32B 5/16* (2006.01)

(52) U.S. Cl.
CPC .................. *B32B 5/30* (2013.01); *B32B 5/16* (2013.01); *B32B 7/02* (2013.01); *Y10T 428/24802* (2015.01); *Y10T 428/24893* (2015.01); *Y10T 428/24942* (2015.01)

(58) Field of Classification Search
CPC .... B32B 5/16; B32B 5/30; B32B 7/02; Y10T 428/24802; Y10T 428/24893; Y10T 428/24942
USPC ...................................................... 428/32.5
See application file for complete search history.

(56) References Cited

U.S. PATENT DOCUMENTS 5,508,247 A * 4/1996 Tran .......................... B41M 5/30
427/152
2004/0171487 A1* 9/2004 Kajikawa ............. B41M 5/3336
503/201
2011/0287930 A1 11/2011 Ochiai et al.
2014/0234558 A1 8/2014 Ikeda et al.
2018/0061281 A1 3/2018 Oda et al.
2020/0023663 A1* 1/2020 Kitano ....................... B65C 9/25

FOREIGN PATENT DOCUMENTS

| JP | 06-332378 | 12/1994 | |
|---|---|---|---|
| JP | 3420678 | 4/2003 | |
| JP | 2003/291526 | * 10/2003 | .............. B41M 5/26 |
| JP | 2005-047596 | 2/2005 | |
| JP | 2005-047597 | 2/2005 | |
| JP | 2005-164915 | 6/2005 | |
| JP | 2008-231171 | 10/2008 | |
| JP | 2013-028015 | 2/2013 | |
| JP | 5465561 | 1/2014 | |
| JP | 2014-051300 | 3/2014 | |
| JP | 2014051300 | * 3/2014 | .............. B65D 85/62 |
| JP | 5936840 | 5/2016 | |
| JP | 2016-177282 | 10/2016 | |
| JP | 6032877 | 11/2016 | |
| WO | WO2015/072410 A1 | 5/2015 | |
| WO | WO 2016/147630 A1 | * 9/2016 | ............... G09F 3/10 |

OTHER PUBLICATIONS

International Search Report dated Jun. 26, 2018 for counterpart International Patent Application No. PCT/JP2018/009366 filed Mar. 12, 2018.

Written Opinion dated Jun. 26, 2018 for counterpart International Patent Application No. PCT/JP2018/009366 filed Mar. 12, 2018.

* cited by examiner

*Primary Examiner* — Betelhem Shewareged
(74) *Attorney, Agent, or Firm* — Oblon, McClelland, Maier & Neustadt, L.L.P.

(57) ABSTRACT

Provided is a linerless thermosensitive recording body package, a roll of a linerless thermosensitive recording sheet being packaged in the linerless thermosensitive recording body package, the linerless thermosensitive recording sheet including a support, a thermosensitive color developing layer over one surface of the support, a release layer over the thermosensitive color developing layer, and an adhesive layer over an opposite surface of the support, the linerless thermosensitive recording sheet being wound in roll shape in a manner that the adhesive layer comes to an internal side of the support, wherein a peel force for peeling the linerless thermosensitive recording sheet from the roll is 50 mN/50 mm or greater but 250 mN/50 mm or less, wherein a water content of the linerless thermosensitive recording sheet is 4.5% or higher but 6.5% or lower, the roll of the linerless thermosensitive recording sheet being seal-packaged in the linerless thermosensitive recording body package.

8 Claims, No Drawings

LINERLESS THERMOSENSITIVE RECORDING BODY PACKAGE

TECHNICAL FIELD

The present disclosure relates to a linerless thermosensitive recording body package.

BACKGROUND ART

In recent years, there have been increasing opportunities in which thermosensitive recording sheets having adhesive layers are used as labels such as price display labels, product description (barcode) labels, quality labels, measuring display labels, and advertisement/publicity labels (stickers). Recording methods for such thermosensitive recording sheets include various methods such as inkjet recording methods and thermosensitive recording methods.

With releasability-imparted release layers formed on the surfaces, linerless thermosensitive recording sheets can be used in a rolled state without release paper and can therefore provide rolled, linerless thermosensitive recording bodys. Therefore, there will be no release paper to be disposed of, leading to alleviation of environmental impacts.

Further, a linerless thermosensitive recording sheet having a low releasability when peeled from the roll is suitable for mitigation of paper jam during conveyance of the linerless thermosensitive recording sheet in a printer, but there is a problem that the low releasability makes the roll shape of the linerless thermosensitive recording sheet easily deformable.

A roll of a linerless thermosensitive recording sheet may become unable to maintain a circular roll shape in a low-humidity storage environment in which many gaps occur in the end surfaces of the roll. In this case, the linerless thermosensitive recording sheet not only cannot be conveyed in a printer, but also cannot be set in a printer.

There is also a problem that in a high-humidity environment, a roll may come out of winding alignment and taper in the direction toward an end surface of the roll to have a bamboo-like shape (telescope-like shape) and cannot be set in a printer.

For example, there are proposed a linerless label packaging method and a roll set, wherein a plurality of linerless labels in a laminated state are reduced in stickiness to each other, for ease of packaging, transportation, management, and handling (for example, see PTL 1).

Further, there is proposed a thermosensitive recording sheet packaging method (for example, see PTL 2).

Furthermore, there are proposed techniques relating to a reverse pillow packaging machine and a packaging method (for example, see PTL 3), and a horizontal pillow packaging machine and a packaging method (for example, see PTLs 4 and 5).

CITATION LIST

Patent Literature

PTL 1: Japanese Unexamined Patent Application Publication No. 2014-51300
PTL 2: Japanese Patent No. 3420678
PTL 3: Japanese Patent No. 5465561
PTL 4: Japanese Unexamined Patent Application Publication No. 2005-47596
PTL 5: Japanese Unexamined Patent Application Publication No. 2005-47597

SUMMARY OF INVENTION

Technical Problem

The present disclosure has an object to provide a linerless thermosensitive recording body package having an excellent roll shape stability for a long-term storage.

Solution to Problem

According to one aspect of the present disclosure, a linerless thermosensitive recording body package includes a roll of a linerless thermosensitive recording sheet. The roll of the linerless thermosensitive recording sheet is packaged in the linerless thermosensitive recording body package. The linerless thermosensitive recording sheet includes a support, a thermosensitive color developing layer provided over one surface of the support, a release layer over the thermosensitive color developing layer, and an adhesive layer provided over an opposite surface of the support. The linerless thermosensitive recording sheet is wound in a roll shape in a manner that the adhesive layer comes to an internal side of the support. A peel force for peeling the linerless thermosensitive recording sheet from the roll is 50 mN/50 mm or greater but 250 mN/50 mm or less. A water content of the linerless thermosensitive recording sheet is 4.5% or higher but 6.5% or lower. The roll of the linerless thermosensitive recording sheet is seal-packaged in the linerless thermosensitive recording body package.

Advantageous Effects of Invention

The present disclosure can provide a linerless thermosensitive recording body package having an excellent roll shape stability for a long-term storage.

DESCRIPTION OF EMBODIMENTS (Linerless Thermosensitive Recording Body Package)

A linerless thermosensitive recording body package of the present disclosure includes a roll of a linerless thermosensitive recording sheet. The roll of the linerless thermosensitive recording sheet is packaged in the linerless thermosensitive recording body package. The linerless thermosensitive recording sheet includes a support, a thermosensitive color developing layer provided over one surface of the support, a release layer over the thermosensitive color developing layer, and an adhesive layer provided over an opposite surface of the support.

The linerless thermosensitive recording sheet is wound in a roll shape in a manner that the adhesive layer comes to an internal side of the support.

A peel force for peeling the linerless thermosensitive recording sheet from the roll is 50 mN/50 mm or greater but 250 mN/50 mm or less.

A water content of the linerless thermosensitive recording sheet is 4.5% or higher but 6.5% or lower.

The roll of the linerless thermosensitive recording sheet is seal-packaged in the linerless thermosensitive recording body package.

The linerless thermosensitive recording body package of the present disclosure is based on the following finding. Existing techniques do not describe whether it is possible to prevent environmentally-affected winding misalignment of rolls during storage after production and packaging. Furthermore, there is a problem that a linerless thermosensitive recording body package having perforations undergoes environmentally-affected winding misalignment over time because roll shape stability of such a package is more susceptible to humidity. Moreover, existing techniques do not describe seal packaging of a roll of a linerless thermosensitive recording sheet having a specific peel force and a specific water content.

Hence, the present disclosure has a technical issue of improving a long-term roll shape storage stability, in a seal-packaged state, of a roll of a linerless thermosensitive recording sheet having a peel force of 50 mN/50 mm or greater but 250 mN/50 mm or less.

The present inventors have reached the resolution of the technical issue, based on a finding that it is preferable to produce a roll of a linerless thermosensitive recording sheet to have a peel force of 140 mN/50 mm or greater but 160 mN/50 mm or less, because some types of printers tend to be paper-jammed when the peel force is greater than 160 mN/50 mm, whereas a rolled linerless thermosensitive recording body having a peel force of 140 mN/50 mm or less undergoes apparent troubles such as winding misalignment and roll shape deformation.

As the peel force, a peel force needed when 2 sheets of a produced linerless thermosensitive recording sheet obtained by cutting the linerless thermosensitive recording sheet in a two-fold state into a size of 300 mm in length and 50 mm in width after the two-fold state has been kept (for 24 hours or longer since roll production (as a pasting period)) are peeled from each other at a tensile angle of 180 degrees at a peeling speed of 0.3 m/min is measured with a tensile tester (available from Shimadzu Corporation, AUTOGRAPH) in an environment of 23 degrees C. and 50% RH.

<Water Content>

A water content of the linerless thermosensitive recording sheet is 4.5% or higher but 6.5% or lower and preferably 5.0% or higher but 6.0% or lower.

When the water content of the linerless thermosensitive recording sheet is 4.5% or higher but 6.5% or lower, there is an advantage that paper jam during conveyance in a printer can be mitigated and the roll of the linerless thermosensitive recording sheet does not easily deform.

The water content is a value per unit weight. The weight of the linerless thermosensitive recording sheet cut into an A4 size is measured. Subsequently, the weight of the linerless thermosensitive recording sheet after dried at 105 degrees C. for 5 hours is measured. Next, the water content can be calculated according to a mathematical formula below based on the weights before and after drying.

Water content (%)=[(weight of linerless thermosensitive recording sheet before dried−weight of linerless thermosensitive recording sheet after dried)/weight of linerless thermosensitive recording sheet before dried]×100

<Packaging>

The linerless thermosensitive recording sheet is wound in a roll shape, and the wound roll is slit into small rolls. For stabilization of the roll shape, the small rolls are individually packaged.

Examples of the individual packaging include packaging in a plastic bag, pillow packaging with a film-like packaging material, shrink packaging, and vacuum packaging. Among these packaging methods, pillow packaging and vacuum packaging can realize seal packaging. Pillow packaging is particularly preferable because continuous packaging is easy.

In the present disclosure, the roll of the linerless thermosensitive recording sheet is seal-packaged.

The seal packaging means packaging in which a roll is packaged with a film-like packaging material and an opening of the packaging material is sealed by thermal fusing for air or water blocking.

As the packaging material, a packaging material that can be sealed at an opening for preventing reactions with air or water is preferable. The packaging material may be a single layer or a laminated body. It is preferable that the packaging material be a laminated body including at least an aluminum layer.

The layer structure of the laminated films is not particularly limited and may be appropriately selected so long as the layer structure includes an aluminum layer. It is preferable that the layer structure include a thermoplastic resin layer at the internal side of the aluminum layer. It is also preferable that the layer structure include an external layer formed of, for example, paper at the external side of the aluminum layer.

The thermoplastic resin is not particularly limited and may be appropriately selected depending on the intended purpose. Examples of the thermoplastic resin include: polyolefins such as polyethylene and polypropylene; polyethylene terephthalate; and polyvinyl alcohols. One of these thermoplastic resins may be used alone or two or more of these thermoplastic resins may be used in combination.

The average thickness of the packaging material is preferably 10 micrometers or greater but 300 micrometers or less and more preferably 30 micrometers or greater but 150 micrometers or less. When the average thickness of the packaging material is 10 micrometers or greater but 300 micrometers or less, there is an advantage that sealability and heat seal efficiency are good.

In the present disclosure, pillow packaging excellent in sealability is employed for packaging the roll of the linerless thermosensitive recording sheet.

The pillow packaging is a packaging method of making both ends of a film meet, heat-sealing the ends with each other to form a tubular shape, and then further heat-sealing an opening. The pillow packaging can be performed with a pillow packaging machine.

The pillow packaging include positive pillow packaging and reverse pillow packaging.

The positive pillow packaging is a method of feeding a film from a take-up body provided above, back-sealing rolls put on a conveyor in a manner to wrap the conveyor from above, moving the conveyor forward in a state that the rolls are arranged one after another in the tube, and simultaneously performing end-sealing of the rolls and cutting.

The reverse pillow packaging is a method of feeding a film from below in order to back-seal the rolls at a height above the rolls.

In the pillow packaging, it is preferable that a heat-sealed portion of the roll be present on the body surface of the roll instead of an end surface of the roll, because this can eliminate a height difference from the end surface and stabilize the roll shape when rolls are stacked up. When the end surface has a height difference, upper rolls among the stacked rolls may gravitationally slide downward. When the slide is severe, it may be impossible to set the rolls in printers.

<Linerless Thermosensitive Recording Sheet>

The linerless thermosensitive recording sheet includes a support, a thermosensitive color developing layer provided over one surface of the support, a release layer over the thermosensitive color developing layer, and an adhesive layer provided over an opposite surface of the support. The linerless thermosensitive recording sheet preferably includes at least any one of a protective layer between the thermosensitive color developing layer and the release layer, a back layer between the support and the adhesive layer, and an undercoat layer between the support and the thermosensitive color developing layer, and further includes other layers as needed.

-Support-

For example, the shape, structure, and size of the support are not particularly limited and may be appropriately selected depending on the intended purpose.

Examples of the shape of the support include a flat plate shape. The structure may be a single-layer structure or a laminated structure. The size may be appropriately selected depending on, for example, the size of the linerless thermosensitive recording sheet.

The material of the support is not particularly limited and may be appropriately selected depending on the intended purpose. Examples of the material of the support include various inorganic materials and organic materials.

Examples of the inorganic materials include glass, quartz, silicon dioxide, aluminum oxide, and metals.

Examples of the organic materials include: paper such as pure paper, art paper, coat paper, and synthetic paper; cellulose derivatives such as cellulose triacetate; and polymer films formed of, for example, polyester resins such as polyethylene terephthalate (PET) and polybutylene terephthalate, polycarbonate resins, polystyrene resins, polymethyl methacrylate resins, polyethylene resins, and polypropylene resins. One of these organic materials may be used alone or two or more of these organic materials may be used in combination. Among these organic materials, pure paper, art paper, coat paper, and polymer films are preferable.

In order to improve adhesiveness of a layer to be coated on the support, it is preferable to subject the support to surface reformation by, for example, corona discharge treatment, oxidation reaction treatment (e.g., chromic acid), etching treatment, treatment for imparting easy adhesiveness, and antistatic treatment.

It is preferable to add, for example, a white pigment such as titanium oxide to the support to make the support white.

The average thickness of the support is not particularly limited, may be appropriately selected depending on the intended purpose, and is preferably 40 micrometers or greater but 100 micrometers or less in terms of conveyability in a printer and windability in a roll shape.

-Release Layer-

Examples of a release agent used in the release layer include ultraviolet-ray-curable silicone resins, thermosetting silicone resins, and fluorine-based release agents. One of these release agents may be used alone or two or more of these release agents may be used in combination. Among these release agents, ultraviolet-ray-curable silicone resins that have a high curing speed and an excellent releasability stability over time are preferable.

Examples of the ultraviolet-ray-curable silicone resins include silicone resins to be cured by cationic polymerization and silicone resins to be cured by radical polymerization. Silicone resins to be cured by radical polymerization may undergo a severe volume shrinkage when cured, to make the support curl.

The amount of the release layer remaining attached after drying is preferably 0.2 g/m$^2$ or greater but 2.0 g/m$^2$ or less. When the amount of the release layer remaining attached after drying is in the range of 0.2 g/m$^2$ or greater but 2.0 g/m$^2$ or less, the peel force is appropriate and paper jam during conveyance in a printer can be mitigated.

-Protective Layer-

The linerless thermosensitive recording sheet further includes a protective layer over the thermosensitive color developing layer.

With a protective layer, it is possible to prevent the thermosensitive color developing layer from being adversely affected by a color developability inhibiting factor present in the linerless thermosensitive recording sheet that is typically stored or used in a roll shape. On the other hand, without a protective layer over the thermosensitive color developing layer, a sufficient barrier property cannot be obtained, to form a factor that degrades color developability depending on the environment of use.

The protective layer contains a resin and a filler, and further contains other components as needed.

-Resin-

The resin is not particularly limited and may be appropriately selected depending on the intended purpose. Examples of the resin include polyvinyl alcohol resins, starch or derivatives of starch, cellulose derivatives such as methoxy cellulose, hydroxyethyl cellulose, and carboxymethyl cellulose, and water-soluble polymers such as sodium polyacrylate, polyvinyl pyrrolidone, styrene/maleic anhydride copolymer alkali salts, isobutylene/maleic anhydride copolymer alkali salts, polyacrylamide, gelatin, and casein. One of these resins may be used alone or two or more of these resins may be used in combination.

Among these resins, polyvinyl alcohols are preferable.

The polyvinyl alcohol resins are saponified products of polyvinyl acetate obtained by polymerizing a vinyl acetate monomer. In addition to the saponified product of polyvinyl acetate, the polyvinyl alcohol resin may contain any other monomer copolymerizable with vinyl ester. Examples of the monomer include olefins such as ethylene, propylene, and isobutylene, unsaturated acids such as acrylic acid, methacrylic acid, crotonic acid, maleic acid, maleic anhydride, and itaconic acid or salts of these unsaturated acids, nitriles such as acrylonitrile and methacrylonitrile, amides such as acrylamide and methacrylamide, and olefin sulfonic acids such as ethylene sulfonic acid, allyl sulfonic acid, and methallyl sulfonic acid or salts of these olefin sulfonic acids.

Examples of the filler include: inorganic fillers such as phosphate fiber, potassium titanate, acicular magnesium hydroxide, whisker, talc, mica, glass flake, calcium carbonate, plate-like calcium carbonate, aluminum hydroxide, plate-like aluminum hydroxide, silica, clay, kaolin, calcined clay, and hydrotalcite; and organic fillers such as crosslinked polystyrene resins, urea resins, silicone resins, crosslinked polymethyl methacrylate resins, and melamine-formaldehyde resins.

The protective layer may further contain in combination with the resin and the filler described above, hitherto used auxiliary additive components such as a surfactant, a thermally-fusible substance, a lubricant, and a pressure color development inhibitor.

The method for forming the protective layer is not particularly limited and may be appropriately selected depending on the intended purpose. For example, the protective layer can be formed by subjecting the resin, the filler, and as needed, the other components to dispersion treatment using a disperser to prepare a protective layer coating liquid, and coating and drying the protective layer coating liquid over the thermosensitive color developing layer.

The amount of the protective layer remaining attached after drying is preferably 1.0 g/m$^2$ or greater but 5.0 g/m$^2$ or less. When the amount of the protective layer remaining attached after drying is in the range of 1.0 g/m² or greater but 5.0 g/m² or less, storage stability and color developing sensitivity will be good.

-Thermosensitive Color Developing Layer-

The thermosensitive color developing layer contains a leuco dye and a developer and further contains other components as needed.

--Leuco Dye--

The leuco dye is a compound that exhibits an electron-donating property, and is not particularly limited. Hitherto known leuco dyes may be used. Examples of the leuco dye include triphenylmethane phthalide-based, triallylmethane-based, fluoran-based, phenothiazine-based, thiopheloran-based, xanthene-based, indophthalyl-based, spiropyran-based, azaphthalide-based, chromenopyrazole-based, methine-based, rhodamineanilinolactam-based, rhodamine-lactame-based, quinazoline-based, diazaxanthene-based, and bislactone-based leuco dyes.

Examples of the leuco dye in terms of qualities such as a color developing property, color fading on an image portion due to resistance to humidity, heat, and light, and background fogging on a background portion include
3-dibutylamino-6-methyl-7-anilinofluoran,
6-[ethyl(4-methylphenyl)amino]-3-methyl-2-anilinofluoran,
2-anilino-3-methyl-6-diethylaminofluoran,
2-anilino-3-methyl-6-(di-n-butylamino)fluoran,
2-anilino-3-methyl-6-(N-n-propyl-N-methylamino)fluoran,
2-anilino-3-methyl-6-(N-isopropyl-N-methylamino)fluoran,
2-anilino-3-methyl-6-(N-isobutyl-N-methylamino)fluoran,
2-anilino-3-methyl-6-(N-n-amyl-N-methylamino)fluoran,
2-anilino-3-methyl-6-(N-s-butyl-N-ethylamino)fluoran,
2-anilino-3-methyl-6-(N-n-amyl-N-ethylamino)fluoran,
2-anilino-3-methyl-6-(N-iso-amyl-N-ethylamino)fluoran,
2-anilino-3-methyl-6-(N-cyclohexyl-N-methylamino)fluoran,
2-anilino-3-methyl-6-(N-ethyl-p-toluidino)fluoran,
2-anilino-3-methyl-6-(N-methyl-p-toluidino)fluoran,
2-(m-trichloromethylanilino)-3-methyl-6-diethylaminofluoran,
2-(m-trifluoromethylanilino)-3-methyl-6-diethylaminofluoran,
2-(m-trifluoromethylanilino)-3-methyl-6-(N-cyclohexyl-N-methylamino)fluoran,
2-(2,4-dimethylanilino)-3-methyl-6-diethylaminofluoran,
2-(N-ethyl-p-toluidino)-3-methyl-6-(N-ethylanilino)fluoran,
2-(N-methyl-p-toluidino)-3-methyl-6-(N-propyl-p-toluidino)fluoran,
2-anilino-6-(N-n-hexyl-N-ethylamino)fluoran,
2-(o-chloroanilino)-6-diethylaminofluoran, 2-(o-bromoanilino)-6-diethylaminofluoran,
2-(o-chloroanilino)-6-dibutylaminofluoran, 2-(o-fluoroanilino)-6-dibutylaminofluoran,
2-(m-trifluoromethylanilino)-6-diethylaminofluoran,
2-(p-acetylanilino)-6-(N-n-amyl-N-n-butylamino)fluoran,
2-benzylamino-6-(N-ethyl-p-toluidino)fluoran,
2-benzylamino-6-(N-methyl-2,4-dimethylanilino)fluoran,
2-benzylamino-6-(N-ethyl-2,4-dimethylanilino)fluoran,
2-dibenzylamino-6-(N-methyl-p-toluidino)fluoran,
2-dibenzylamino-6-(N-ethyl-p-toluidino)fluoran,
2-(di-p-methylbenzylamino)-6-(N-ethyl-p-toluidino)fluoran,
2-(α-phenylethylamino)-6-(N-ethyl-p-toluidino)fluoran,
2-methylamino-6-(N-methylanilino)fluoran, 2-methylamino-6-(N-ethylanilino)fluoran,
2-methylamino-6-(N-propylanilino)fluoran,
2-ethylamino-6-(N-methyl-p-toluidino)fluoran,
2-methylamino-6-(N-methyl-2,4-dimethylanilino)fluoran,
2-ethylamino-6-(N-methyl-2,4-dimethylanilino)fluoran,
2-dimethylamino-6-(N-methylanilino)fluoran,
2-dimethylamino-6-(N-ethylanilino)fluoran,
2-diethylamino-6-(N-methyl-p-toluidino)fluoran,
2-diethylamino-6-(N-ethyl-p-toluidino)fluoran,
2-dipropylamino-6-(N-methylanilino)fluoran,
2-dipropylamino-6-(N-ethylanilino)fluoran, 2-amino-6-(N-methylanilino)fluoran,
2-amino-6-(N-ethylanilino)fluoran, 2-amino-6-(N-propylanilino)fluoran,
2-amino-6-(N-methyl-p-toluidino)fluoran, 2-amino-6-(N-ethyl-p-toluidino)fluoran,
2-amino-6-(N-propyl-p-toluidino)fluoran,
2-amino-6-(N-methyl-p-ethylanilino)fluoran,
2-amino-6-(N-ethyl-p-ethylanilino)fluoran,
2-amino-6-(N-propyl-p-ethylanilino)fluoran,
2-amino-6-(N-methyl-2,4-dimethylanilino)fluoran,
2-amino-6-(N-ethyl-2,4-dimethylanilino)fluoran,
2-amino-6-(N-propyl-2,4-dimethylanilino)fluoran,
2-amino-6-(N-methyl-p-chloroanilino)fluoran,
2-amino-6-(N-ethyl-p-chloroanilino)fluoran,
2-amino-6-(N-propyl-p-chloroanilino)fluoran, 2,3-dimethyl-6-dimethylaminofluoran,
3-methyl-6-(N-ethyl-p-toluidino)fluoran, 2-chloro-6-diethylaminofluoran,
2-bromo-6-diethylaminofluoran, 2-chloro-6-dipropylaminofluoran,
3-chloro-6-cyclohexylaminofluoran, 3-bromo-6-cyclohexylaminofluoran,
2-chloro-6-(N-ethyl-N-isoamylamino)fluoran,
2-chloro-3-methyl-6-diethylaminofluoran, 2-anilino-3-chloro-6-diethylaminofluoran,
2-(o-chloroanilino)-3-chloro-6-cyclohexylaminofluoran,
2-(m-trifluoromethylanilino)-3-chloro-6-diethylaminofluoran,
2-(2,3-dichloroanilino)-3-chloro-6-diethylaminofluoran,
1,2-benzo-6-diethylaminofluoran, 1,2-benzo-6-(N-ethyl-N-isoamylamino)fluoran,
1,2-benzo-6-dibutylaminofluoran, 1,2-benzo-6-(N-ethyl-N-cyclohexylamino)fluoran,
1,2-benzo-6-(N-ethyl-toluidino)fluoran,
2-anilino-3-methyl-6-(N-2-ethoxypropyl-N-ethylamino)fluoran,
2-(p-chloroanilino)-6-(N-n-octylamino)fluoran,
2-(p-chloroanilino)-6-(N-n-palmitylamino)fluoran,
2-(p-chloroanilino)-6-(di-n-octylamino)fluoran,
2-benzoylamino-6-(N-ethyl-p-toluidino)fluoran,
2-(o-methoxybenzoylamino)-6-(N-ethyl-p-toluidino)fluoran,
2-dibenzylamino-4-methyl-6-diethylaminofluoran,
2-dibenzylamino-4-methoxy-6-(N-methyl-p-toluidino)fluoran,
2-dibenzylamino-4-methyl-6-(N-ethyl-p-toluidino)fluoran,
2-(α-phenylethylamino)-4-methyl-6-diethylaminofluoran,
2-(p-toluidino)-3-(t-butyl)-6-(N-methyl-p-toluidino)fluoran,
2-(o-methoxycarbonylanilino)-6-diethylaminofluoran,
2-acetylamino-6-(N-methyl-p-toluidino)fluoran,
3-diethylamino-6-(m-trifluoromethylanilino)fluoran,
4-methoxy-6-(N-ethyl-p-toluidino)fluoran,
2-ethoxyethylamino-3-chloro-6-dibutylaminofluoran,
2-dibenzylamino-4-chloro-6-(N-ethyl-p-toluidino)fluoran,
2-(α-phenylethylamino)-4-chloro-6-diethylaminofluoran,
2-(N-benzyl-p-trifluoromethylanilino)-4-chloro-6-diethylaminofluoran, 2-anilino-3-methyl-6-pyrrolidinofluoran, 2-anilino-3-chloro-6-pyrrolidinofluoran,
2-anilino-3-methyl-6-(N-ethyl-N-tetrahydrofurfurylamino)fluoran,
2-mesidino-4',5'-benzo-6-diethylaminofluoran,
2-(m-trifluoromethylanilino)-3-methyl-6-pyrrolidinofluoran,
2-(α-naphthylamino)-3,4-benzo-4'-bromo-6-(N-benzyl-N-cyclohexylamino)fluoran,
2-piperidino-6-diethylaminofluoran,
2-(N-n-propyl-p-trifluoromethylanilino)-6-morpholinofluoran,
2-(di-N-p-chlorophenyl-methylamino)-6-pyrrolidinofluoran,
2-(N-n-propyl-m-trifluoromethylanilino)-6-morpholinofluoran,
1,2-benzo-6-(N-ethyl-N-n-octylamino)fluoran, 1,2-benzo-6-diallylaminofluoran,
1,2-benzo-6-(N-ethoxyethyl-N-ethylamino)fluoran, benzoleuco methylene blue,
2-[3,6-bis(diethylamino)]-6-(o-chloroanilino)xanthylic benzoate lactam,
2-[3,6-bis(diethylamino)]-9-(o-chloroanilino)xanthylic benzoate lactam,
3,3-bis(p-dimethylaminophenyl)phthalide,
3,3-bis(p-dimethylaminophenyl)-6-dimethylamino phthalide,
3,3-bis(p-dimethylaminophenyl)-6-diethylamino phthalide,
3,3-bis(p-dimethylaminophenyl)-6-chlorophthalide,
3,3-bis(p-dibutylaminophenyl)phthalide,
3-(2-methoxy-4-dimethylaminophenyl)-3-(2-hydroxy-4,5-dichlorophenyl)phthalide,
3-(2-hydroxy-4-dimethylaminophenyl)-3-(2-methoxy-5-chlorophenyl)phthalide,
3-(2-hydroxy-4-dimethoxyaminophenyl)-3-(2-methoxy-5-chlorophenyl)phthalide,
3-(2-hydroxy-4-dimethylaminophenyl)-3-(2-methoxy-5-nitrophenyl)phthalide,
3-(2-hydroxy-4-diethylaminophenyl)-3-(2-methoxy-5-methylphenyl)phthalide,
3,6-bis(dimethylamino)fluorenespiro(9,3')-6'-dimethylamino phthalide,
6'-chloro-8'-methoxy-benzoindolino-spiropyran, and 6'-bromo-2'-methoxy-benzoindolino-spiropyran. One of these leuco dyes may be used alone or two or more of these leuco dyes may be used in combination.

The content of the leuco dye is preferably 5% by mass or greater but 20% by mass or less and more preferably 10% by mass or greater but 15% by mass or less of the total amount of the thermosensitive color developing layer.

--Developer--

As the developer, various electron-accepting substances that react with the leuco dye when the leuco dye is heated and make the leuco dye develop a color can be used.

Specific examples of such electron-accepting substances include phenolic compounds and organic or inorganic acidic compounds presented below, or esters or salts of these substances.

Examples of the developer include bisphenol A, tetrabromo bisphenol A, gallic acid, salicylic acid, 3-isopropylsalicylic acid, 3-cyclohexylsalicylic acid, 3,5-di-tert-butyl salicylic acid, 3,5-di-α-methylbenzyl salicylic acid, 4,4'-isopropylidene diphenol, 1,1'-isopropylidene bis(2-chlorophenol), 4,4'-isopropylidene bis(2,6-dibromophenol), 4,4'-isopropylidene bis(2,6-dichlorophenol), 4,4'-isopropylidene bis(2-methylphenol), 4,4'-isopropylidene bis(2,6-dimethylphenol), 4,4'-isopropylidene bis(2-tert-butylphenol), 4,4'-sec-butylidene diphenol, 4,4'-cyclohexylidene bisphenol, 4,4'-cyclohexylidene bis(2-methylphenol), 4-tert-butylphenol, 4-phenylphenol, 4-hydroxydiphenoxide, aαnaphthol, β-naphthol, 3,5-xylenol, thymol, methyl-4-hydroxybenzoate, 4-hydroxyacetophenone, novolac-type phenol resins, 2,2'-thiobis(4,6-dichlorophenol), catechol, resorcin, hydroquinone, pyrogallol, phloroglucinol, phloroglucinol carboxylic acid, 4-tert-octylcatechol, 2,2'-methylenebis(4-chlorophenol), 2,2'-methylenebis(4-methyl-6-tert-butylphenol), 2,2'-dihydroxydiphenol, ethyl p-hydroxybenzoate, propyl p-hydroxybenzoate, butyl p-hydroxybenzoate, benzyl p-hydroxybenzoate, p-hydroxybenzoic acid-p-chlorobenzyl, p-hydroxybenzoic acid-o-chlorobenzyl, p-hydroxybenzoic acid-p-methylbenzyl, p-hydroxybenzoic acid-n-octyl, benzoic acid, zinc salicylate, 1-hydroxy-2-naphthoic acid, 2-hydroxy-6-naphthoic acid, zinc 2-hydroxy-6-naphthoate, 4-hydroxydiphenyl sulfone, 4-hydroxy-4'-chlorodiphenyl sulfone, bis(4-hydroxyphenyl)sulfide, 2-hydroxy-p-toluic acid, zinc 3,5-di-tert-butylsalicylate, tin 3,5-di-tert-butylsalicylate, tartaric acid, oxalic acid, maleic acid, citric acid, succinic acid, stearic acid, 4-hydroxyphthalic acid, boric acid, thiourea derivative, 4-hydroxythiophenol derivative, bis(4-hydroxyphenyl)acetic acid, ethyl bis(4-hydroxyphenyl)acetate, bis(4-hydroxyphenyl)acetic acid-n-propyl, bis (4-hydroxyphenyl)acetic acid-n-butyl, phenyl bis(4-hydroxyphenyl)acetate, benzyl bis(4-hydroxyphenyl)acetate, phenethyl bis(4-hydroxyphenyl)acetate, bis(3-methyl-4-hydroxyphenyl)acetic acid, methyl bis(3-methyl-4-hydroxyphenyl)acetate, bis(3-methyl-4-hydroxyphenyl)acetic acid-n-propyl, 1,7-bis(4-hydroxyphenylthio)3,5-dioxaheptane, 1,5-bis(4-hydroxyphenylthio)3-oxapentane, dimethyl 4-hydroxyphthalate, 4-hydroxy-4'-methoxydiphenyl sulfone, 4-hydroxy-4'-ethoxydiphenyl sulfone, 4-hydroxy-4'-isopropoxydiphenyl sulfone, 4-hydroxy-4'-propoxydiphenyl sulfone, 4-hydroxy-4'-butoxydiphenyl sulfone, 4-hydroxy-4'-isopropoxydiphenyl sulfone, 4-hydroxy-4'-sec-butoxydiphenyl sulfone, 4-hydroxy-4'-tert-butoxydiphenyl sulfone, 4-hydroxy-4'-benzyloxydiphenyl sulfone, 4-hydroxy-4'-phenoxydiphenyl sulfone, 4-hydroxy-4'-(m-methylbenzyloxy)diphenyl sulfone, 4-hydroxy-4'-(p-methylbenzyloxy)diphenyl sulfone, 4-hydroxy-4'-(o-methylbenzyloxy)diphenyl sulfone, 4-hydroxy-4'-(p-chlorobenzyloxy)diphenyl sulfone, and 4-hydroxy-4'-oxyallyldiphenyl sulfone. One of these developers may be used alone or two or more of these developers may be used in combination.

The mixing ratio between the leuco dye and the developer in the thermosensitive color developing layer is preferably 0.5 parts by mass or greater but 10 parts by mass or less of the developer and more preferably 1 part by mass or greater but 5 parts by mass or less of the developer relative to 1 part by mass of the leuco dye.

In addition to the leuco dye and the developer, the thermosensitive color developing layer may also contain known substances commonly used in thermosensitive color developing layers of linerless thermosensitive recording sheets, such as a water-soluble resin and an aqueous resin emulsion, a filler, a thermally-fusible substance, a cross-linking agent, a pigment, a surfactant, and a fluorescent brightener, and a lubricant.

The filler is not particularly limited and may be appropriately selected depending on the intended purpose. Examples of the filler include: inorganic particles such as calcium carbonate, silica, zinc oxide, titanium oxide, aluminum hydroxide, zinc hydroxide, barium sulfate, clay, talc, surface-treated calcium carbonate, and silica; and organic powders such as urea-formalin resins, styrene-methacrylic acid copolymers, and polystyrene resins.

Examples of the thermally-fusible substance include: fatty acids such as stearic acid and behenic acid; fatty acid amides such as stearic acid amide and palmitic acid amide; fatty acid metal salts such as zinc stearate, aluminum stearate, calcium stearate, zinc palmitate, and zinc behenate; and p-benzyl biphenyl, m-terphenyl, triphenylmethane, benzyl p-benzyloxybenzoate, β-benzyloxynaphthalene, phenyl β-naphthoate, phenyl 1-hydroxy-2-naphthoate, methyl 1-hydroxy-2-naphthoate, diphenyl carbonate, guaiacol carbonate, dibenzyl terephthalate, dimethyl terephthalate, 1,4-dimethoxynaphthalene, 1,4-diethoxynaphthalene, 1,4-dibenzyloxynaphthalene, 1,2-diphenoxyethane, 1,2-bis(3-methylphenoxy)ethane, 1,2-bis(4-methylphenoxy)ethane, 1,4-diphenoxy-2-butene, 1,2-bis(4-methoxyphenylthio)ethane, dibenzoylmethane, 1,4-diphenylthiobutane, 1,4-diphenylthio-2-butene, 1,3-bis(2-vinyloxyethoxy)benzene, 1,4-bis(2-vinyloxyethoxy)benzene, p-(2-vinyloxyethoxy)biphenyl, p-aryloxybiphenyl, p-propargyloxybiphenyl, dibenzoyloxymethane, dibenzoyloxypropane, dibenzyl disulfide, 1,1-diphenyl ethanol, 1,1-diphenylpropanol, p-benzyloxy benzylalcohol, 1,3-phenoxy-2-propanol, N-octadecylcarbamoyl-p-methoxycarbonyl benzene, N-octadecylcarbamoyl benzene, 1,2-bis(4-methoxyphenoxy)propane, 1,5-bis(4-methoxyphenoxy)-3-oxapentane, 1,2-bis(3,4-dimethylphenyl)ethane, dibenzyl oxalate, oxalic acid bis(4-methylbenzyl) ester, oxalic acid bis(4-chlorobenzyl) ester, and 4-acetotoluidide. One of these thermally-fusible substances may be used alone or two or more of these thermally-fusible substances may be used in combination.

The method for forming the thermosensitive color developing layer is not particularly limited and commonly known methods may be used. For example, the leuco dye and the developer are subjected to pulverization and dispersion treatment together with a resin and the other components using a disperser such as a ball mill, an attritor, and a sand mill until the dispersion particle diameter becomes from 0.1 micrometers through 3 micrometers. Subsequently, the resultant is mixed with, for example, a loading material and a thermally-fusible substance dispersion liquid as needed, to prepare a thermosensitive color developing layer coating liquid. The thermosensitive color developing layer coating liquid is coated over the support or the undercoat layer and dried. In this way, the thermosensitive color developing layer can be formed.

The coating method is not particularly limited and may be appropriately selected depending on the intended purpose. Examples of the coating method include a blade coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a 4-roll or 5-roll coating method, a dip coating method, a curtain coating method, a slide coating method, and a die coating method.

The amount of the thermosensitive color developing layer remaining attached after drying is not particularly limited, may be appropriately selected depending on the intended purpose, and is preferably 1 g/m$^2$ or greater but 20 g/m$^2$ or less and more preferably 3 g/m$^2$ or greater but 10 g/m$^2$ or less.

-Undercoat Layer-

As needed, it is preferable to provide the linerless thermosensitive recording sheet with an undercoat layer containing hollow particles between the support and the thermosensitive color developing layer with a view to, for example, prevention of migration of an adhesive to the thermosensitive color developing layer and improvement of color developing sensitivity, smoothness, and adhesiveness.

The hollow particles are not particularly limited and may be appropriately selected depending on the intended purpose. The rate of hollowness of the hollow particles is preferably 30% or higher and more preferably 80% or higher. When the rate of hollowness of the hollow particles is 30% or higher, color developing sensitivity and color developing accuracy will be good.

The rate of hollowness refers to a ratio between the volume of a hollow particle and the hollow portion, and is expressed by a percentage (%). The hollow particles can be regarded as almost a spherical shape. Therefore, the rate of hollowness is represented by the formula below.

$$\text{Rate of hollowness (\%)} = [(\text{volume of hollow portion})/(\text{volume of hollow particle})] \times 100$$

The hollow particles are nonfoamable hollow particles that are already in a foamed state with air or any other gas contained within a shell formed of a thermoplastic resin. The volume average particle diameter of the hollow particles is preferably 0.4 micrometers or greater but 10 micrometers or less. When the volume average particle diameter (particle outer diameter) of the hollow particles is 0.4 micrometers or greater but 10 micrometers or less, a good sensitivity improving effect can be obtained. Therefore, it is preferable that the hollow particles have a volume average particle diameter in the range described above and a uniform distribution peaks with slight unevenness.

Examples of the thermoplastic resin constituting the shell of the hollow particles include polystyrene resins, polyvinyl chloride resins, polyvinylidene chloride resins, polyvinyl acetate resins, polyacrylic acid ester resins, polyacrylonitrile resins, and polybutadiene resins or copolymers of these thermoplastic resins. Copolymers mainly formed of vinylidene chloride and acrylonitrile among these thermoplastic resins are particularly preferable.

The content of the hollow particles in the undercoat layer is not particularly limited, may be appropriately selected depending on the intended purpose, and is preferably 35% by mass or greater but 80% by mass or less.

It is preferable that the undercoat layer contain a binder and a thermally-fusible substance. As the binder and the thermally-fusible substance, the same ones as used in the thermosensitive color developing layer can be used.

The method for forming the undercoat layer is not particularly limited and may be appropriately selected depending on the intended purpose. For example, the hollow particles, the binder, the thermally-fusible substance, and as needed, other components are subjected to dispersion treatment using a disperser, to prepare an undercoat layer coating liquid. The undercoat layer coating liquid is coated over the support and dried. In this way, the undercoat layer can be formed.

It is preferable to provide the undercoat layer such that the amount remaining attached after drying is 2 g/m$^2$ or greater but 10 g/m$^2$ or less. The amount remaining attached after drying is more preferably in the range of 2.5 g/m$^2$ or greater but 7 g/m$^2$ or less. In the above range of the amount remaining attached, a linerless thermosensitive recording sheet having a high sensitivity during image printing can be provided.

-Back Layer-

The back layer contains a resin and further contains other components as needed.

The resin is preferably at least any one selected from the group consisting of a styrene-acrylic acid ester copolymer and a styrene-butadiene copolymer.

Examples of other resins include latexes of, for example, acrylic acid ester copolymers, styrene-butadiene-acrylic-based copolymers, and emulsions of, for example, vinyl acetate resins, vinyl acetate-acrylic acid copolymers, acrylic acid ester resins, and polyurethane resins. One of these resins may be used alone or two or more of these resins may be used in combination.

For the back layer, a filler such as kaolin and aluminum hydroxide may be used, in order to improve coatability of a back layer coating liquid and prevent blocking with the protective layer during production of the linerless thermosensitive recording sheet. In addition, an inorganic filler or an organic filler presented below can be used.

Examples of the inorganic filler include carbonates, silicates, metal oxides, and sulfuric acid compounds.

Examples of the organic filler include silicone resins, cellulose resins, epoxy resins, nylon resins, phenol resins, polyurethane resins, urea resins, melamine resins, polyester resins, polycarbonate resins, styrene-based resins, acrylic-based resins, polyethylene resins, formaldehyde-based resins, and polymethyl methacrylate resins.

The amount of the back layer remaining attached after drying is preferably $0.5$ $g/m^2$ or greater but $5.0$ $g/m^2$ or less. When the amount of the back layer remaining attached after drying is in the range of $0.5$ $g/m^2$ or greater but $5.0$ $g/m^2$ or less, the barrier function during coating of the adhesive agent will be adequate, and the adhesive agent can infiltrate the support, leading to an advantage that the water content of the linerless thermosensitive recording sheet will be adequate.

-Adhesive Layer-

Examples of the adhesive agent used in the adhesive layer include acrylic resins, acrylic acid ester-styrene copolymers, and acrylic acid ester-methacrylic acid ester-styrene copolymers that are obtained by emulsion polymerization of monomers which are mainly formed of at least one kind of (meth)acrylic acid alkyl ester containing an alkyl group. One of these adhesive agents may be used alone or two or more of these adhesive agents may be used in combination.

In the present specification, "(meth)acrylic" refers to "acrylic or methacrylic".

Examples of the (meth)acrylic acid alkyl ester include n-pentyl (meth)acrylate, n-hexyl (meth)acrylate, 2-ethylhexyl (meth)acrylate, n-octyl (meth)acrylate, isooctyl (meth)acrylate, n-decyl (meth)acrylate, and n-dodecyl (meth)acrylate. One of these (meth)acrylic acid alkyl esters may be used alone or two or more of these (meth)acrylic acid alkyl esters may be used in combination.

In addition to the component described above, carboxyl group-containing radically-polymerizable unsaturated monomers, and radically-polymerizable unsaturated monomers that are copolymerizable with each of these unsaturated monomers, namely the (meth)acrylic acid alkyl ester and the carboxyl group-containing radically-polymerizable unsaturated monomers may also be added.

The adhesive agent can be coated by, for example, a bar coating method, a roll coating method, a comma coating method, and a gravure coating method. The coated adhesive agent may be dried in a drying furnace. This makes it possible to adjust the water content of the linerless thermosensitive recording sheet.

The amount of the adhesive agent remaining attached after drying is preferably $8$ $g/m^2$ or greater but $25$ $g/m^2$ or less.

When the amount of the adhesive agent remaining attached after drying is $8$ $g/m^2$ or greater but $25$ $g/m^2$ or less, a sufficient adhesive force can be obtained, and the adhesive agent will not exude from an end surface of a roll when used in a roll shape.

-Other Layers-

The other layers are not particularly limited and may be appropriately selected depending on the intended purpose. Examples of the other layers include an intermediate layer and a magnetic recording layer.

The linerless thermosensitive recording sheet can be used as a linerless thermosensitive recording label when the linerless thermosensitive recording sheet is wound in a roll shape and the sheet is fed out from the obtained roll and cut into a predetermined size. However, the linerless thermosensitive recording sheet can also be used as is in the sheet shape.

<Roll>

The roll is a product obtained by winding the linerless thermosensitive recording sheet in a roll shape in a manner that the adhesive layer comes to an internal side of the support. The roll may be would around a core material or may be wound without a core material.

The recording method using the linerless thermosensitive recording sheet of the linerless thermosensitive recording body package of the present disclosure is not particularly limited and may be appropriately selected depending on the intended purpose. Examples of the recording method include a thermal head and a laser.

For example, the shape, structure, and size of the thermal head are not particularly limited and may be appropriately selected depending on the intended purpose.

The laser is not particularly limited and may be appropriately selected depending on the intended purpose. Examples of the laser include a $CO_2$ laser and a semiconductor laser having a wavelength of 9.3 micrometers or longer but 10.6 micrometers or shorter.

The linerless thermosensitive recording body package of the present disclosure can be used in many fields such as the field of POS for perishable foods, box lunches, and delicatessen; the field of copying of, for example, books and documents; the field of communication by, for example, facsimile; the ticketing field such as ticketing machines, receipts, and signed receipts; baggage tags in the airline industry; and pill cases and pill bottles.

EXAMPLES

The present disclosure will be described below by way of Examples. The present disclosure should not be construed as being limited to these Examples.

Example 1

Preparation of Protective Layer Coating Liquid

The components described below were subjected to dispersion treatment for 24 hours using a sand mill, to prepare <A liquid>.

<A Liquid>

Aluminum hydroxide (with an average particle diameter of 0.6 micrometers, available from Showa Denko K.K., HYDIRITE H-43M)—20 parts by mass 10% by mass itaconic acid-modified polyvinyl alcohol aqueous solution—20 parts by mass Water—60 parts by mass Subsequently, the components described below were mixed and stirred, to prepare a protective layer coating liquid <B liquid>.

<A liquid> prepared above—75 parts by mass

10% by mass diacetone-modified polyvinyl alcohol aqueous solution—100 parts by mass 10% by mass N-aminopolyacrylamide (with a weight average molecular weight of 10,000 and a degree of hydrazidation of 50%) aqueous solution—15 parts by mass 1% by mass ammonia aqueous solution—5 parts by mass Water—105 parts by mass Preparation of Thermosensitive Color Developing Layer Coating Liquid <C Liquid>

2-Anilino-3-methyl-6-(di-n-butylamino)fluoran—20 parts by mass

10% by mass itaconic acid-modified polyvinyl alcohol (with a modification rate of 1 mol %) aqueous solution—20 parts by mass Water—60 parts by mass <D Liquid>

4-Hydroxy-4'-isopropoxydiphenyl sulfone—20 parts by mass

10% by mass itaconic acid-modified polyvinyl alcohol (with a modification rate of 1 mol %) aqueous solution—20 parts by mass Silica—10 parts by mass Water—50 parts by mass The components for <C liquid> and <D liquid> described above were subjected to dispersion treatment using a sand mill until the average particle diameter of each liquid became 1.0 micrometer or less, to prepare a leuco dye dispersion liquid <C liquid> and a developer dispersion liquid <D liquid>.

Subsequently, <C liquid> and <D liquid> were mixed at a ratio of 1:7, adjusted to have a solid concentration of 25% by mass, and stirred, to prepare a thermosensitive color developing layer coating liquid <E liquid>.

<Preparation of Undercoat Layer Coating Liquid>

The components described below were mixed and stirred, to prepare an undercoat layer coating liquid <F liquid>.

<F Liquid>

Calcined kaolin (available from Engelhard & Co., ULTRA WHITE 90)—36 parts by mass Styrene-butadiene copolymer (available from Nippon A&L Inc., SMARTEX PA-8076, with a solid concentration of 47.5% by mass)—10 parts by mass Water—54 parts by mass <Preparation of Back Layer Coating Liquid>

<G-1 Liquid>

The components described below were mixed and stirred, to prepare a back layer coating liquid <G-1 liquid>.

Styrene-acrylic acid ester copolymer (available from BASF GmbH, JONCRYL PDX7630A, with a solid concentration of 33% by mass)—75 parts by mass Water—25 parts by mass <Preparation of Release Layer Coating Liquid>

The components described below were mixed and stirred, to prepare a release layer coating liquid <H-1 liquid>.

<H-1 Liquid>

Cationically-curable UV silicone resin (available from Arakawa Chemical Industries, Ltd., SILICOLEASE UV POLY215)—100 parts by mass Light release modifier (available from Arakawa Chemical Industries, Ltd., SIL-ICOLEASE RCA200)—40 parts by mass Reaction initiator (available from Arakawa Chemical Industries, Ltd., SIL-ICOLEASE UV CATA211)—5 parts by mass -Production of Linerless Thermosensitive Recording Sheet- The undercoat layer coating liquid <F liquid> was coated over a surface of a support (pure paper having a basis weight of about 60 g/m$^2$) such that the amount of the undercoat layer coating liquid remaining attached after drying would be 3.0 g/m$^2$, and dried, to form an undercoat layer.

Next, the thermosensitive color developing layer coating liquid <E liquid> and the protective layer coating liquid <B liquid> were coated over the undercoat layer sequentially in a laminated state such that the amounts of the liquids remaining attached after drying would be 3.0 g/m$^2$ and 2.0 g/m$^2$, and dried, to form a thermosensitive color developing layer and a protective layer.

Next, the back layer coating liquid <G-1 liquid> was coated in an amount of 2.0 g/m$^2$ over a surface of the support opposite to the surface provided with the undercoat layer, and dried, to form a back layer.

Next, calendering treatment was performed such that the Oken smoothness of the surface would be about 2,000 seconds, and then the release layer coating liquid <H-1 liquid> was coated in a mass of 0.8 g/m$^2$ over the protective layer and irradiated with UV with an integrated illuminance of 110 mJ/cm$^2$, to cure the release layer coating liquid.

Next, an acrylic emulsion (available from Henkel Japan Ltd., AQUENCE PS AQ590 NACOR, with a solid concentration of 54% by mass) serving as a pressure-sensitive adhesive was coated over the back layer over the back surface of the support such that the mass of the acrylic emulsion remaining attached after drying would be 20 g/m$^2$, to form an adhesive layer. In the way described above, a linerless thermosensitive recording sheet was produced.

-Production of Roll of Linerless Thermosensitive Recording Sheet-

Next, the produced linerless thermosensitive recording sheet was dried such that the water content would be 5.5%, and wound in a roll shape for a length of 310 m by pasting with the release layer of the linerless thermosensitive recording sheet, to produce a roll.

-Production of Linerless Thermosensitive Recording Body Package-

Next, the obtained roll of the linerless thermosensitive recording sheet was packaged with a pillow packaging machine (available from Omori Machinery Co., Ltd.) in a reverse pillow packaging manner (using a polypropylene packaging material having a thickness of 30 micrometers) such that the portion to be heat-sealed was on an end surface of the roll, to obtain a linerless thermosensitive recording body package of Example 1.

Example 2

A linerless thermosensitive recording sheet and a linerless thermosensitive recording body package were produced in the same manner as in Example 1, except that unlike in Example 1, the release layer coating liquid <H-1 liquid> was changed to a release layer coating liquid <H-2 liquid> described below.

<H-2 Liquid>
Cationically-curable UV silicone resin (available from Arakawa Chemical Industries, Ltd., SILICOLEASE UV POLY215)—100 parts by mass Light release modifier (available from Arakawa Chemical Industries, Ltd., SILICOLEASE RCA200)—15 parts by mass Reaction initiator (available from Arakawa Chemical Industries, Ltd., SIL-ICOLEASE UV CATA211)—5 parts by mass Example 3

A linerless thermosensitive recording sheet and a linerless thermosensitive recording body package were produced in the same manner as in Example 1, except that unlike in Example 1, the release layer coating liquid <H-1 liquid> was changed to a release layer coating liquid <H-3 liquid> described below.

<H-3 Liquid>
Cationically-curable UV silicone resin (available from Arakawa Chemical Industries, Ltd., SILICOLEASE UV POLY215)—100 parts by mass Light release modifier (available from Arakawa Chemical Industries, Ltd., SIL-ICOLEASE RCA200)—7 parts by mass Reaction initiator (available from Arakawa Chemical Industries, Ltd., SIL-ICOLEASE UV CATA211)—5 parts by mass Example 4

A linerless thermosensitive recording sheet and a linerless thermosensitive recording body package were produced in the same manner as in Example 2, except that unlike in Example 2, the linerless thermosensitive recording sheet was dried such that the water content would be 4.5%.

Example 5

A linerless thermosensitive recording sheet and a linerless thermosensitive recording body package were produced in the same manner as in Example 2, except that unlike in Example 2, the linerless thermosensitive recording sheet was dried such that the water content would be 6.5%.

Example 6

A linerless thermosensitive recording sheet and a linerless thermosensitive recording body package were produced in the same manner as in Example 2, except that unlike in Example 2, the back layer coating liquid <G-1 liquid> was changed to a back layer coating liquid <G-2 liquid> described below.

<G-2 Liquid>
Styrene-butadiene copolymer (available from Zeon Corporation, LX407ST5674, with a solid concentration of 48.5% by mass and a glass transition temperature (Tg) of 10 degrees C.)—50 parts by mass
Water—50 parts by mass Example 7

A linerless thermosensitive recording sheet and a linerless thermosensitive recording body package were produced in the same manner as in Example 2, except that unlike in Example 2, the undercoat layer coating liquid <F liquid> was not coated.

Example 8

A linerless thermosensitive recording sheet and a linerless thermosensitive recording body package were produced in the same manner as in Example 2, except that unlike in Example 2, the back layer coating liquid <G-1 liquid> was not coated.

Example 9

A linerless thermosensitive recording sheet and a linerless thermosensitive recording body package were produced in the same manner as in Example 2, except that unlike in Example 2, the undercoat layer coating liquid <F liquid> and the back layer coating liquid <G-1 liquid> were not coated.

Example 10

A linerless thermosensitive recording sheet and a linerless thermosensitive recording body package were produced in the same manner as in Example 2, except that unlike in Example 2, calcined kaolin in the undercoat layer coating liquid <F liquid> of Example 1 was changed to vinylidene chloride/acrylonitrile copolymer particles (with a vinylidene chloride/acrylonitrile ratio by mole of 6/4, a solid concentration of 27.5% by mass, an average particle diameter of 3 micrometers, and a rate of hollowness of 90%).

Example 11

A linerless thermosensitive recording sheet and a linerless thermosensitive recording body package were produced in the same manner as in Example 2, except that unlike in Example 2, the portion to be heat-sealed by the reverse pillow packaging was on the body surface of the roll.

Comparative Example 1

A linerless thermosensitive recording sheet was produced in the same manner as in Example 2, except that unlike in Example 2, the reverse pillow packaging was not performed.

Comparative Example 2

A linerless thermosensitive recording sheet and a linerless thermosensitive recording body package were produced in the same manner as in Example 1, except that unlike in Example 1, the acrylic emulsion (available from Henkel Japan Ltd., AQUENCE PS AQ590 NACOR, with a solid concentration of 54% by mass) serving as a pressure-sensitive adhesive was coated such that the amount of the acrylic emulsion remaining attached after drying would be 11 g/m$^2$ by mass.

Comparative Example 3

A linerless thermosensitive recording sheet and a linerless thermosensitive recording body package were produced in the same manner as in Example 1, except that unlike in Example 1, the release layer coating liquid <H-1 liquid> was changed to a release layer coating liquid <H-4 liquid> described below.

<H-4 Liquid>
Cationically-curable UV silicone resin (available from Arakawa Chemical Industries, Ltd., SILICOLEASE UV POLY215)—100 parts by mass Light release modifier (available from Arakawa Chemical Industries, Ltd., SIL-ICOLEASE RCA200)—3 parts by mass Reaction initiator (available from Arakawa Chemical Industries, Ltd., SILICOLEASE UV CATA211)—5 parts by mass Comparative Example 4

A linerless thermosensitive recording sheet and a linerless thermosensitive recording body package were produced in the same manner as in Example 1, except that unlike in Example 1, the release layer coating liquid <H-1 liquid> was changed to a release layer coating liquid <H-5 liquid> described below.

<H-5 Liquid>
Cationically-curable UV silicone resin (available from Arakawa Chemical Industries, Ltd., SILICOLEASE UV POLY215)—100 parts by mass Light release modifier (available from Arakawa Chemical Industries, Ltd., SIL-ICOLEASE RCA200)—3 parts by mass Reaction initiator (available from Arakawa Chemical Industries, Ltd., SIL-ICOLEASE UV CATA211)—6.5 parts by mass Comparative Example 5

A linerless thermosensitive recording sheet and a linerless thermosensitive recording body package were produced in the same manner as in Example 2, except that unlike in Example 2, the linerless thermosensitive recording sheet was dried such that the water content would be 4.3%.

Comparative Example 6

A linerless thermosensitive recording sheet and a linerless thermosensitive recording body package were produced in the same manner as in Example 2, except that unlike in Example 2, the linerless thermosensitive recording sheet was dried such that the water content would be 7.0%.

Comparative Example 7

A linerless thermosensitive recording sheet and a linerless thermosensitive recording body package were produced in the same manner as in Example 2, except that unlike in Example 2, the roll of the linerless thermosensitive recording sheet was packaged in a plastic bag (non-sealed packaging).

Comparative Example 8

A linerless thermosensitive recording sheet and a linerless thermosensitive recording body package were produced in the same manner as in Example 2, except that unlike in Example 2, the roll of the linerless thermosensitive recording sheet was packaged by shrink packaging (non-sealed packaging, using a polyethylene terephthalate packaging material having a thickness of 30 micrometers).

Next, properties of each of the obtained linerless thermosensitive recording sheets and linerless thermosensitive recording body packages were evaluated in the manners described below. The results are presented in Table 1 and Table 2.

<Water Content>
The water content was a value per unit weight. The weight of the linerless thermosensitive recording sheet cut into an A4 size was measured. Subsequently, the weight of the linerless thermosensitive recording sheet after dried at 105 degrees C. for 5 hours was measured. Next, the water content was calculated according to a mathematical formula below based on the weights before and after drying.

Water content (%)=[(weight of linerless thermosensitive recording sheet before dried−weight of linerless thermosensitive recording sheet after dried)/weight of linerless thermosensitive recording sheet before dried]×100

<Peel Force>
As the peel force, a peel force needed when 2 sheets of each produced linerless thermosensitive recording sheet obtained by cutting each produced linerless thermosensitive recording sheet in a two-fold state into a size of 300 mm in length and 50 mm in width after the two-fold state had been kept (for 24 hours or longer since roll production (as a pasting period)) were peeled from each other at a tensile angle of 180 degrees at a peeling speed of 0.3 m/min was measured with a tensile tester (available from Shimadzu Corporation, AUTOGRAPH) in an environment of 23 degrees C. and 50% RH.

<Storage of Roll>
A roll was produced by winding each linerless thermosensitive recording sheet for a length of 310 m. A linerless thermosensitive recording body package was obtained by packaging the produced roll in the manner presented in the "packaging" field of Table 1. Two such packages were stacked and left to stand for 7 days in the two storage environments described below, and subsequently left to stand for 1 day in a state that the packages were torn. Note that packaging was not performed in Comparative Example 1.

-Storage Environments-
5 degrees C., 30% RH
40 degrees C., 90% RH

<Amount of Change of Maximum Diameter of Roll>
The amount of change of the maximum diameter of the roll between before and after the storage of the roll was calculated according to the mathematical formula 1 below and evaluated according to the criteria described below. The maximum diameter of the roll was measured with a pair of Vernier calipers.

Amount of change of maximum diameter of roll=maximum diameter after storage−maximum diameter before storage  <Mathematical Formula 1>

<Criteria for Judging Amount of Change of Maximum Diameter>
A: Initial value+less than 0.2 mm
B: Initial value+0.2 mm or greater but 0.5 mm or less
C: Initial value+0.6 mm or greater but 0.9 mm or less
D: Initial value+1.0 mm or greater <Winding Misalignment of Roll>
A roll was produced by winding each linerless thermosensitive recording sheet for a length of 310 m. The width of the roll was measured with a pair of Vernier calipers. The roll was stored in the storage environments described above, and the difference between the width of the roll before storage and the width of the roll after storage (amount of winding misalignment=width after storage−width before storage) was calculated and evaluated according to the criteria described below. Note that packaging was not performed in Comparative Example 1.

<Criteria for Judging Amount of Winding Misalignment>
A: Initial value+less than 0.2 mm
B: Initial value+0.2 mm or greater but 1 mm or less
C: Initial value+1.1 mm or greater but 2 mm or less
D: Initial value+2.1 mm or greater <Conveyability in Printer>

The number of times of occurrence of paper jam when 500 labels were printed and launched from each linerless thermosensitive recording sheet at 40 degrees C. and 90% RH using a printer IP-UNI available from Ishida Co., Ltd. was measured to evaluate conveyability in printer according to the criteria described below.

<Evaluation Criteria>

B: No paper jam
C: The number of times of occurrence of paper jam was 1 or more but 2 or less
D: The number of times of occurrence of paper jam was 3 or more.

<Total Evaluation>

Total evaluation was performed according to the criteria described below based on the result of each test. Examples 2, 6, 10, and 11 resulted in well-balanced qualities, an excellent roll shape stability, and an excellent printer matchability compared with the other Examples and Comparative Examples.

<Evaluation Criteria>

B: All of the tests resulted in B or A.
C: None of the tests resulted in D, and 1 or more tests resulted in C.
D: One or more tests resulted in D.

TABLE 1

| | Water content (%) | Peel power (mN/50 mm) | Packaging | Storage at 5 degrees C. and 30% RH | | | |
|---|---|---|---|---|---|---|---|
| | | | | Maximum diameter | | Winding misalignment | |
| | | | | Amount of change (mm) | Judgment | Amount (mm) | Judgment |
| Ex. 1 | 5.5 | 55 | Reverse pillow packaging (seal packaging) | 0.3 | B | 0 | A |
| Ex. 2 | 5.5 | 150 | Reverse pillow packaging (seal packaging) | 0.2 | B | 0 | A |
| Ex. 3 | 5.5 | 250 | Reverse pillow packaging (seal packaging) | 0.1 | A | 0 | A |
| Ex. 4 | 4.5 | 150 | Reverse pillow packaging (seal packaging) | 0 | A | 0.1 | A |
| Ex. 5 | 6.5 | 150 | Reverse pillow packaging (seal packaging) | 0.8 | C | 0 | A |
| Ex. 6 | 5.5 | 150 | Reverse pillow packaging (seal packaging) | 0.3 | B | 0 | A |
| Ex. 7 | 5.5 | 150 | Reverse pillow packaging (seal packaging) | 0.6 | C | 0 | A |
| Ex. 8 | 5.5 | 150 | Reverse pillow packaging (seal packaging) | 0.6 | C | 0 | A |
| Ex. 9 | 5.5 | 150 | Reverse pillow packaging (seal packaging) | 0.9 | C | 0 | A |
| Ex. 10 | 5.5 | 150 | Reverse pillow packaging (seal packaging) | 0.1 | B | 0 | A |
| Ex. 11 | 5.5 | 150 | Reverse pillow packaging (seal packaging) | 0.2 | B | 0 | A |
| Comp. Ex. 1 | 5.5 | 150 | Not performed | 0.7 | C | 0 | A |
| Comp. Ex. 2 | 5.5 | 45 | Reverse pillow packaging (seal packaging) | 0.3 | B | 0 | A |
| Comp. Ex. 3 | 5.5 | 400 | Reverse pillow packaging (seal packaging) | 0.3 | B | 0 | A |
| Comp. Ex. 4 | 5.5 | 280 | Reverse pillow packaging (seal packaging) | 0.2 | B | 0 | A |
| Comp. Ex. 5 | 4.3 | 150 | Reverse pillow packaging (seal packaging) | 0 | A | 0.2 | B |
| Comp. Ex. 6 | 7.0 | 150 | Reverse pillow packaging (seal packaging) | 1.1 | D | 0 | A |
| Comp. Ex. 7 | 5.5 | 150 | Plastic bag (non-sealed packaging) | 0.9 | C | 0 | A |
| Comp. Ex. 8 | 5.5 | 150 | Shrink packaging (non-sealed packaging) | 0.3 | B | 0 | A |

TABLE 2

| | Storage at 40 degrees C. and 80% RH | | | | | |
|---|---|---|---|---|---|---|
| | Maximum diameter | | Winding misalignment | | Conveyability in printer | Total evaluation |
| | Amount of change (mm) | Judgment | Amount (mm) | Judgment | | |
| Ex. 1 | 0.1 | A | 1.4 | C | B | C |
| Ex. 2 | 0 | A | 0.5 | B | B | B |

TABLE 2-continued

| | Storage at 40 degrees C. and 80% RH | | | | | |
|---|---|---|---|---|---|---|
| | Maximum diameter | | Winding misalignment | | | |
| | Amount of change (mm) | Judgment | Amount (mm) | Judgment | Conveyability in printer | Total evaluation |
| Ex. 3 | 0 | A | 0.4 | B | C | C |
| Ex. 4 | 0.1 | A | 1.9 | C | B | C |
| Ex. 5 | 0 | A | 0.1 | A | B | C |
| Ex. 6 | 0.1 | A | 0.6 | B | B | B |
| Ex. 7 | 0.1 | A | 1.2 | C | B | C |
| Ex. 8 | 0.1 | A | 0.6 | B | B | C |
| Ex. 9 | 0.1 | A | 0.7 | B | B | C |
| Ex. 10 | 0 | A | 0.2 | B | B | B |
| Ex. 11 | 0 | A | 0.5 | B | B | B |
| Comp. Ex. 1 | 0 | A | 5.4 | D | B | D |
| Comp. Ex. 2 | 0.1 | A | 2.3 | D | B | D |
| Comp. Ex. 3 | 0 | A | 0.4 | B | D | D |
| Comp. Ex. 4 | 0 | A | 0.4 | B | D | D |
| Comp. Ex. 5 | 0.3 | B | 6.2 | D | B | D |
| Comp. Ex. 6 | 0 | A | 0.1 | A | B | D |
| Comp. Ex. 7 | 0.3 | B | 4.3 | D | B | D |
| Comp. Ex. 8 | 0.3 | B | 3.5 | D | B | D |

From the results of Table 1 and Table 2, Examples 1 to 11 resulted in smaller changes of the roll shape (maximum diameter and winding misalignment) through the storage at 5 degrees C. and 30% RH and the storage at 40 degrees C. and 90% RH, compared with Comparative Examples 1 and 2 and Comparative Examples 5 to 8.

In terms of conveyability in a printer, Examples 1 to 11 resulted in less occurrence of paper jam compared with Comparative Example 3.

Aspects of the present disclosure are as follows, for example.

<1> A linerless thermosensitive recording body package including
a roll of a linerless thermosensitive recording sheet,
the roll of the linerless thermosensitive recording sheet being packaged in the linerless thermosensitive recording body package,
the linerless thermosensitive recording sheet including:
a support;
a thermosensitive color developing layer provided over one surface of the support;
a release layer over the thermosensitive color developing layer; and
an adhesive layer provided over an opposite surface of the support,
the linerless thermosensitive recording sheet being wound in a roll shape in a manner that the adhesive layer comes to an internal side of the support,
wherein a peel force for peeling the linerless thermosensitive recording sheet from the roll is 50 mN/50 mm or greater but 250 mN/50 mm or less,
wherein a water content of the linerless thermosensitive recording sheet is 4.5% or higher but 6.5% or lower, and
wherein the roll of the linerless thermosensitive recording sheet is seal-packaged in the linerless thermosensitive recording body package.

<2> The linerless thermosensitive recording body package according to <1>,
wherein the linerless thermosensitive recording sheet further includes a protective layer between the thermosensitive color developing layer and the release layer.

<3> The linerless thermosensitive recording body package according to <1> or <2>,
wherein the thermosensitive color developing layer contains a leuco dye and a developer.

<4> The linerless thermosensitive recording body package according to any one of <1> to <3>,
wherein the linerless thermosensitive recording sheet further includes a back layer between the support and the adhesive layer.

<5> The linerless thermosensitive recording body package according to <4>,
wherein the back layer contains at least any one selected from the group consisting of a styrene-acrylic acid ester copolymer and a styrene-butadiene copolymer.

<6> The linerless thermosensitive recording body package according to any one of <1> to <5>,
wherein the linerless thermosensitive recording sheet further includes an undercoat layer between the support and the thermosensitive color developing layer, the undercoat layer including hollow particles.

<7> The linerless thermosensitive recording body package according to <6>,
wherein a rate of hollowness of the hollow particles is 80% or higher.

<8> The linerless thermosensitive recording body package according to any one of <1> to <7>,
wherein the roll of the linerless thermosensitive recording sheet is seal-packaged by pillow packaging.

<9> The linerless thermosensitive recording body package according to <8>,
wherein a portion of the roll heat-sealed by the pillow packaging is on a body surface of the roll.

<10> The linerless thermosensitive recording body package according to any one of <1> to <9>,
wherein the linerless thermosensitive recording sheet is wound around a core material in a roll shape in a manner that the adhesive layer comes to the internal side of the support.

The linerless thermosensitive recording body package according to any one of <1> to <10> can solve the various problems in the related art and can achieve the object of the present disclosure.

The invention claimed is:

1. A linerless thermosensitive recording body package comprising
a roll of a linerless thermosensitive recording sheet,
the roll of the linerless thermosensitive recording sheet being packaged in the linerless thermosensitive recording body package,
wherein the linerless thermosensitive recording sheet comprises:
a support;
a thermosensitive color developing layer provided over one surface of the support;
a release layer over the thermosensitive color developing layer; and
an adhesive layer provided over an opposite surface of the support,
wherein the linerless thermosensitive recording sheet is wound in a roll shape in a manner that the adhesive layer comes to an internal side of the support,
wherein a peel force for peeling the linerless thermosensitive recording sheet from the roll is 50 mN/50 mm or greater but 250 mN/50 mm or less,
wherein a water content of the linerless thermosensitive recording sheet is 4.5% or higher but 6.5% or lower, and
wherein the roll of the linerless thermosensitive recording sheet is seal-packaged in the linerless thermosensitive recording body package.

2. The linerless thermosensitive recording body package according to claim 1,
wherein the linerless thermosensitive recording sheet further comprises a protective layer between the thermosensitive color developing layer and the release layer.

3. The linerless thermosensitive recording body package according to claim 1,
wherein the linerless thermosensitive recording sheet further comprises a back layer between the support and the adhesive layer.

4. The linerless thermosensitive recording body package according to claim 3,
wherein the back layer comprises at least any one selected from the group consisting of a styrene-acrylic acid ester copolymer and a styrene-butadiene copolymer.

5. The linerless thermosensitive recording body package according to claim 1,
wherein the linerless thermosensitive recording sheet further comprises an undercoat layer between the support and the thermosensitive color developing layer, and
wherein the undercoat layer comprises hollow particles.

6. The linerless thermosensitive recording body package according to claim 1,
wherein the roll of the linerless thermosensitive recording sheet is seal-packaged by pillow packaging.

7. The linerless thermosensitive recording body package according to claim 6,
wherein a portion of the roll heat-sealed by the pillow packaging is on a body surface of the roll.

8. The linerless thermosensitive recording body package according to claim 1,
wherein one roll of the linerless thermosensitive recording sheet is individually packaged in the linerless thermosensitive recording body package.

* * * * *